United States Patent [19]

Clasen et al.

[11] Patent Number: 4,689,066

[45] Date of Patent: Aug. 25, 1987

[54] METHOD FOR MANUFACTURING GLASS BODIES

[75] Inventors: Rolf Clasen, Aachen; Wilhelm G. Hermann, Roetgen, both of Fed. Rep. of Germany

[73] Assignee: U.S. Philips Corporation, New York, N.Y.

[21] Appl. No.: 835,483

[22] Filed: Mar. 3, 1986

[30] Foreign Application Priority Data

Mar. 29, 1985 [DE] Fed. Rep. of Germany ....... 3511456

[51] Int. Cl.$^4$ .......................................... C03B 37/016
[52] U.S. Cl. ........................................ 65/18.1; 65/2;
65/3.11; 65/3.12; 65/18.4; 65/900; 65/901;
65/17; 264/27; 156/DIG. 108; 501/12
[58] Field of Search .............. 264/27, 104, 105; 65/2,
65/3.11, 3.12, 17, 18.1, 18.3, 18.4, DIG. 16,
DIG. 900, DIG. 901; 156/DIG. 108; 501/12

[56] References Cited

U.S. PATENT DOCUMENTS

| | | | |
|---|---|---|---|
| 4,324,576 | 4/1982 | Matsuyama et al. | 65/3.11 X |
| 4,419,115 | 12/1983 | Johnson et al. | 65/3.11 X |

FOREIGN PATENT DOCUMENTS

| | | | |
|---|---|---|---|
| 2334639 | 7/1977 | France | 65/3.11 |
| 7800001 | 10/1978 | Int'l Pat. Institute | 65/17 |

*Primary Examiner*—Robert L. Lindsay
*Attorney, Agent, or Firm*—Norman N. Spain

[57] ABSTRACT

A method of and arrangements for manufacturing glass bodies, in which the starting material for the glass body, being an anhydrous suspension having a microdispersed solids content, is used to form a porous green body which is subsequently purified and sintered, in which by separating the phases of an anhydrous suspension the green body is formed by means of electrophoresis on a deposition electrode whose shape corresponds to that of the glass body to be produced.

18 Claims, 3 Drawing Figures

METHOD FOR MANUFACTURING GLASS BODIES

BACKGROUND OF THE INVENTION

The invention relates to a method of manufacturing glass bodies, in which the starting material for the glass body, being an anhydrous suspension having a microdispersed solids content, is used to form a porous green body which is subsequently purified and sintered.

The invention further relates to arrangements for carrying out such a method as well as to the use of the glass bodies manufactured by the method in accordance with the invention.

The method mentioned in the opening paragraph is particularly suitable for the manufacture of quartz-glass preforms for optical waveguides.

For the manufacture of very pure quartz-glass bodies, particularly preforms for optical waveguides, methods are known in which a porous green body is manufactured from microdispersed $SiO_2$ glass particles, after which the said green body is first purified in, for example, a chlorine-containing atmosphere at temperatures ranging from 600° to 900° C. Next, the green body is sintered at a temperature of approximately 1500° C. to form compact and transparent glass; the sintering temperature depends on the size of the $SiO_2$ particles and the homogeneity of the green body.

Processing of microdispersed quartz-glass particles involves a substantial investment in equipment, preforms for the manufacture of a green body which is easy to manipulate and presses to compact this green body in order to obtain a green body having a density which is so high as to enable an efficient sintering process, i.e. sintering at temperatures $\leqq 1550°$ C. to form a glass body which is free from bubbles and reams. Such a method for the manufacture of a preform for optical waveguides is known from, for example, DE 3240335.

In order to produce green bodies having a sufficiently high density, microdispersed $SiO_2$ suspensions which are deformed into a green body may alternatively be used. DE 2925309 describes a method in which an $SiO_2$ suspension is sprayed in or on a carrier tube. A disadvantage of this method is that high demands are made on a uniformly operating spraying device and that the green body obtained cannot be purified in a hot gas atmosphere which reacts with the impurities because the carrier tube is not porous.

BRIEF SUMMARY OF THE INVENTION

It is an object of the invention to provide a method of and arrangements for manufacturing high-purity glass bodies by means of which a green body of such a porosity is obtained that in an intermediate heating stage the green body can be thoroughly purified in a gas atmosphere which reacts with the impurities present, which green body, however, has such a high density that the subsequent sintering process can be carried out without any additional compacting operations.

This object is achieved by a method in accordance with the invention, in whicch by separating the phases of the suspension the green body is formed by means of electrophoresis on a deposition electrode whose shape corresponds to that of the glass body to be produced.

Arrangements for carrying out this method are characterized by:

1. a vessel for holding the starting material in the form of a suspension which is to be separated into phases, having a deposition electrode whose shape corresponds to that of the green body to be produced and which is introduced in the suspension contained in the vessel, having a counter electrode which as to shape and size corresponds to the deposition electrode and which is arranged in the vessel so as to be spaced from the deposition electrode, and provided with a power source which is electrically connected to the counterelectrode and the deposition electrode via electrode terminals, 2. a tube for holding starting material in the form of a suspension which is to be separated into phases, which tube functions as a deposition electrode and has an electrically insulating bottom part, the shape of which tube corresponds to that of the green body to be produced, an inner electrode being introduced into the tube as a counter electrode which is located equidistantly from each point on the deposition surface, and a power source being present which is electrically connected to the inner electrode and the tube via electrode terminals, and 3. a vessel for holding an electrically conductive liquid in which a porous membrane whose shape corresponds to that of the green body to be produced is introduced as a deposition electrode, the pores of the membrane having a diameter smaller than the average particle diameter of the solids content of a suspension which is to be separated into phases in the arrangement, a preferably movable electrode being arranged in front of and spaced from the principal surface of the membrane, which faces the deposition surface, which vessel comprises a movable feeder tube which is made of an electrically conductive material and which projects into the membrane, via which feeder tube the suspension can be introduced into the membrane, which vessel has a power source which is electrically connected to the feeder tube and the electrode which is movable along the membrane, via electrode terminals.

DETAILED DESCRIPTION OF THE INVENTION

Figure 1:
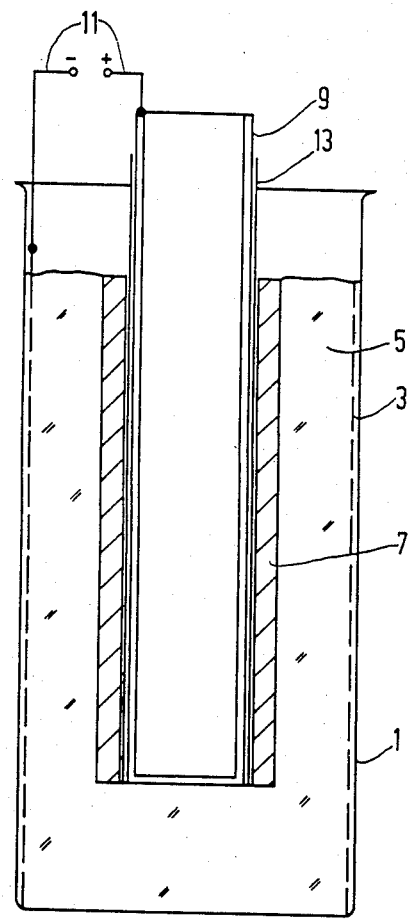
FIG. 1, FIG. 2 and FIG. 3 are each sectional view of arrangements for carrying out the method of the invention.

In accordance with an advantageous modified embodiment of the method in accordance with the invention, the suspension that is used as the starting material for the glass body, comprises $SiO_2$ particles having a diameter in the range from 10 to 500 nm, preferably between 15 and 100 nm, the average particle diameter being 40 nm, and an electrically poorly conducting, anhydrous liquid, particularly ethanol, is used as a dispersing liquid. For the deposition of layers which are free of macropores, it is efficient to use an anhydrous, organic liquid as a dispersing liquid. When water containing suspensions are used the problem presents itself that not ony electronegative solid particles in particular quartz-glass particles are deposited on the anode, but also that during deposition at voltages <1 V oxygen is set free which is also deposited on the anode and, thus, is enclosed in the growing solid layer to form unwanted pores within the green body thus formed.

In accordance with further advantageous embodiments of the invention, an ionogenic, anhydrous additive, which moves the pH valve of the suspension towards alkalinity (pH≦10) is added to the suspension. For this purpose, preferably a quaternary ammonium compound, preferably tetramethylammonium hydroxide (TMAH), is added to the dispersing liquid in the suspension in n amount between 0.1 and 5% by weight of the solids content. This additive is very volatile and can be fully removed from the green body in a subsequent purifying-heating step, so that very pure quartz-glass bodies can be produced. Due to the addition of an ammonium compound, for example TMAH, green bodies of a relatively great strength are obtained because gel-forming takes place at the contact areas of two of the $SiO_2$ primary particles. $SiO_2$ is deposited at the location of the contact areas and forms a bridging layer because $SiO_2$ is slightly soluble in TMAH.

In accordance with a further advantageous embodiment of the method in accordance with the invention, a laminated body is formed on the deposition electrode by depositing several successive layers of differently doped suspensions. For this purpose, the first suspension is removed from the arrangement when the desired layer thickness of the green body is obtained, and the deposition process is continued with a second suspension which is, for example, differently doped. Thus, the present method is very suitable for producing preforms for optical waveguides having a step refractive index profile. It is also possible to produce an optical waveguide having a W-shaped profile by providing an intermediate layer having a lower refractive index which is is obtained by using a suitably doped suspension. Dopants for changing the refractive index of a glass body are known to those skilled in the art; for example $GeO_2$ or $Al_2O_3$ to raise the refractive index and $B_2O_3$ or fluorine to lower the refractive index. The present method also makes it possible to produce a quartz-glass body whose refractive index variation is substantially continuous, by depositing a plurality of layers having a graded doping.

In accordance with a further advantageous embodiment of the method in accordance with the invention, a membrane in the form of a porous green body which is formed from the starting material for the glass body to be produced is used as a deposition electrode, the electrophoretic deposition of the solids content of the suspension being produced by, preferably, a movable electrode which is arranged in front of and spaced from the principal surface of the membrane, which is located opposite the deposition surface. This has the advantage that for the manufacture of preforms for optical waveguides by a method in accordance with the invention the use of foreign materials for the deposition electrode, which may lead to the inclusion of impurities in the green body obtained, can be avoided. This method also enabling the production of high-precision optical waveguides having a step refractive index profile, when differently doped starting materials are used for the membrane and the green body to be deposited. Instead of a porous, not yet sintered green body it is also possible to use a porous, sintered body of the starting material for the glass body as a membrane. In this connection it is very advantageous that layers formed from the solids content of the suspension can be manufactured by means of a grain fraction which is changed with respect to the grain fraction used for the manufacture of such a membrane. The contraction behaviour of a body depends upon the grain fraction; when a sintered body formed from the starting material for the glass body is used as a membrane, it is thus possible to adapt the contraction behaviour of the membrane and the layer to be deposited thereon to each other. In this modified embodiment of the method in accordance with the invention, the membrane and the deposited green body are purified together in one purification step in a suitable heated gas phase, after which they are sintered together to form a transparent glass body.

If, in accordance with an advantageous modified embodiment of the method in accordance with the invention, the solids content of the suspension is deposited on a thermoplastic and electrically conducting intermediate layer on the deposition electrode, which layer consists of, preferably, 40% by weight of paraffin having a melting point of from 46° to 50° C. and 60% by weight of graphite powder, there is the advantage that the green body which is deposited on the deposition electrode may be easily removed from the mould be heating the deposition electrode.

Further advantages of the invention are that green bodies for the manufacture of glass bodies, particularly preforms for optical waveguides, can be obtained with only very few equipment, which green bodies are on the one hand sufficiently porous for impurities to be effectively removed in a heated gas atmosphere and on the other hand have such a high density and homogeneity that they can be sintered to form very pure glass bodies without the necessity of any intermediate treatment such as, for example, hot isostatic pressing.

A further advantage of the method in accordance with the present invention is that is is also possible to produce green bodies having other than circular cross-sections, for example, angular tubes or rods or even randomly shaped hollow bodies. The depositing green bodies can be dried without the development of cracks and after the purification and sintering steps they yield true to size, transparent and very pure types of glass having highly polished surfaces.

Quartz-glass tubes manufactured as described above may additionally be used in the manufacture of halogen lamps or gas-discharge lamps, where, as also applies to green bodies which are to be used for producing optical waveguides, a very low water content and a high silicon dioxide content of the glass is imperative.

Separating the dispersing liquid from the solid phase of the suspension through electrophoresis results in the formation of a relatively dry, strong green body which is easy to manipulate and can be freed from the residual moisture in a relatively short time without the development of cracks, for example, by drying under atmospheric conditions or by an exchange of solvents.

Figure 2:
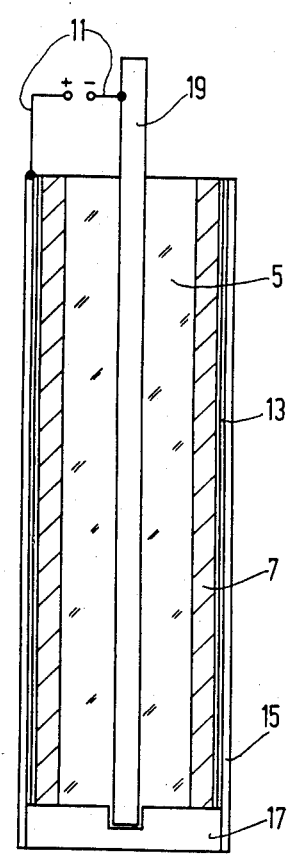
Figure 3:
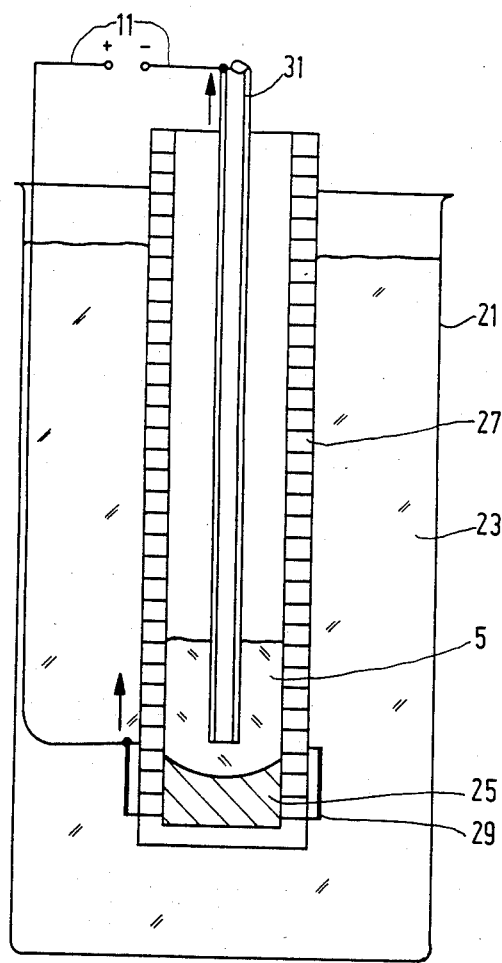

These drying processes are known to those skilled in the art. Embodiments of the invention will now be described with reference to the accompanying drawing, in which:

FIGS. 1 and 2 are sectional views of arrangements for the manufacture of tubular green bodies by the method in accordance with the invention FIG. 3 is a sectional view of an arrangement for the manufacture of rod-shaped green bodies by the method in accordance with the invention.

FIG. 1 depicts an arrangement for the manufacture of a tubular green body 7. For this purpose, an anhydrous suspension 5 which is, for example, homogenized in an ultrasonic field and which is formed from microdispersed $SiO_2$ particles whose diameter ranges from 10 to 500 nm, preferably 15 to 100 nm, having an average particle diameter of 40 nm, is introduced in a vessel 1 together with a poorly electrically conductive, anhydrous liquid, particularly ethanol, as a dispersing liquid (solid: dispersing fluid weight ratio from 1:1.5 to 1:8), to which a quaternary ammonium compound is added, particularly tetramethyl ammonium hydroxide (TMAH) in an amount of from 0.1 to 5% by weight of the solids content of the suspension, in which vessel a counter electrode 3 in the form of a grid electrode is arranged at the wall of the vessel 1. Furthermore, a deposition electrode is arranged in the vessel 1, and consequently in the suspension 5, so as to be spaced from the counter electrode 3, which deposition electrode is formed by, in this case, a cylinder 9 having an outside diameter of 22 mm.

The deposition electrode (cylinder 9) which is immersed in the suspension 5, is made of an electrically conductive, non-metallic material, preferably graphite, and is spaced equidistantly from all points of the counter electrode 3. In order to facilitate the removal from the mould of the green body 7 which is deposited on the cylinder 9, the deposition electrode in the form of the cylinder 9 is suitably provided with a thermoplastic and electrically conductive layer 13 having a thickness of approximately 1 mm. which advantageously is made of a material which consists of 40% by weight of paraffin having a melting point of from 46° to 50° C. and 60% by weight of graphite powder. In order to remove a deposited green body from the mould, the deposition electrode in the form of a graphite cylinder 9 is heated from the inside, for example by means of hot water, after which the green body 7 which is deposited on the layer 13 may be removed easily from the cylinder 9. When an electric voltage from a power source which is not shown is applied to the electrodes 3 and 9 through electrode terminal 11 the green body 7 is deposited as a uniformly thick layer. At a voltage of 30 V the current density is about 0.07 mA/cm$^2$ of the electrode area; after a deposition time of 15 minutes the layer thickness of the deposited green body 7 is about 1.5 mm.

The distance between the counter electrode 3 and the deposition electrode (cylinder 9) is non-critical and does not affect the uniform growth of the layer.

In a practical example of an embodiment, using an arrangement as shown in FIG. 1, the following method was employed: 100 grams of commercially available SiO$_2$ having a particle size of 15–100 nm and an average particle diameter of 40 nm was dispersed in 400 ml of ethanol and 4 ml of tetramethyl ammonium hydroxide (TMAH) until a homogeneous suspension was obtained. Homogenisation can be obtained, for example, by applying an ultrasonic field having a frequency f of 35 kHz to the suspension.

This suspension was separated into phases, as described with reference to FIG. 1, and the green body obtained was slowly dried in air for 24 hours in order to remove he residual moisture. The green body thus obtained has a density of 52% of the density of compact quartz-glass. Subsequently, the green body which was separated from the deposition electrode as described above was heated in 100 minutes to a temperature of 800° C. and in order to remove impurities, in particular water and transition metals, was subjected for 1.5 hours to an O$_2$-gas stream which is saturated with SOCl$_2$. The subsequent sintering process was carried out in a helium atmosphere comprising 2% by volume of chlorine gas at a temperature of 1500° C., the green body being led through the oven at a speed of 3 mm/minute. Thus, a transparent glass tube having an outside diameter of 19 mm, a wall thickness of 1.2 mm and containing <10 ppb of impurities was obtained. The glass tube formed has a density of 2.20 g/cm$^3$ and a refractive index n$_D$ of 1.4598.

In accordance with the method described above, it is also possible to produce green bodies having layer structures of differently doped SiO$_2$ suspensions. For this purpose, the suspension is evacuated from the arrangement and replaced by another differently doped suspension when the required layer thickness is obtained. In this way green bodies can be formed which after sintering yield types of glass having a refractive index gradient.

FIG. 2 depicts an arrangement by means of which it is also possible to form a tubular green body 7 from the suspension 5. This figure depicts the electrophoretic deposition of a green body in a tube 15 which is sealed by means of an electrically insulating bottom part 17. The tube 15 may consist of an electrically conductive material, such as for example graphite, and is suitably provided at its deposition surface with a thermoplastic electrically conductive layer 13 which serves to facilitate the removal from the mould of the green body which is deposited on the inside of the tube. The tube 15 may also consist of an electrically insulating material, in which case its deposition surface is coated with an electrically conductive thermoplastic layer 13 of the above-described composition.

Within the tube 15 there is provided an inner electrode 19 by way of counter electrode which is centered by the bottom part 17. The tube 15 may be in one piece or it may consist of several parts. When green bodies of larger dimensions are deposited, a tube consisting of several parts facilitates the removal from the mould.

The suspension used, the deposition conditions as well as the finishing of the green body obtained and the properties of the quartz-glass body obtained correspond to the example described with reference to FIG. 1.

An alternative arrangement which may be used for the manufacture of rod-shaped green bodies 25 is shown in FIG. 3. Here a cylinder shaped porous membrane, which correspond to the shape of the green body to be produced is introduced in a vessel 21, which membrane serves as a deposition electrode. This cylinder shaped membrane has pores of a diameter ≦ the average particle diameter of the solid particles in the suspension, i.e. ≦40 nm for the exemplary embodiment herein. This cylinder shaped membrane 27 is surrounded by a movable ring electrode which is arranged at the principal surface opposite the deposition surface and can be moved along this principal surface. The vessel 21 is filled with an electrically conductive liquid 23, for example, water. A feeder tube 31 which can be moved along the axis of the membrane 27 projects into the membrane through which feeder tube the starting material in the form of the suspension 5 which is to be separated into phases can be introduced into the membrane 27. The feeder tube 31 is made of electrically conductive, preferably, non-metallic material and forms the counter electrode of the movable ring electrode 29. Both electrodes are connected to a power source which is not shown through the electrode terminals 11. A rod-shaped green body 25 can be formed within the cylinder shaped membrane by electrophoretic deposition of the solids content of the suspension 5, while continuously pulling up the feeder tube 31 in the direction of the arrows shown in FIG. 3. The separated liquid phase of the suspension 5 can be removed from the arrangement via an overflow (not shown) which is located at the top of the arrangement.

The suspension used, the deposition conditions as well as the finishing of the green body obtained and the properties of the quartz-glass body obtained also correspond to the example described with reference to FIG. 1.

What is claimed is:

1. A method of manufacturing glass bodies, in which an anhydrous suspension having a microdispersed solids content, is used to form a porous green body which is subsequently purified and sintered, the improvement wherein the green body is formed by separating the phases of the suspension by means of electrophoresis while depositing solids content of said suppression on a deposition electrode whose shape corresponds to that of the glass body to be produced.

2. A method as claimed in claim 1, wherein the anhydrous suspension comprises $SiO_2$ particles having a diameter in the range of between 15 and 100 nm, the averge particle diameter being 40 nm.

3. A method as claimed in claim 1, wherein a poorly electrically conductive, anhydrous liquid is used as a dispersing liquid for said suspension.

4. A method as claimed in claim 3, wherein ethanol is used as the dispersing liquid.

5. A method as claimed in claim 1, wherein a suspension is used having a solid: dispersing liquid weight ratio from 1:1.5 to 1.8.

6. A method as claimed in claim 1, wherein an ionogenic, anhydrous additive is added to the suspension for causing the pH value of the suspension to be in the alkaline range with pH<10.

7. A method as claimed in claim 6, wherein a quaternary ammonium compound is used as an ionogenic additive.

8. A method as claimed in claim 7, wherein tetramethyl ammonium hydroxide (TMAH) is used as an ionogenic additive.

9. A method as claimed in claim 6 wherein the ionogenic additive is added in an amount of from 0.1 to 5% by weight of the solids content of the suspension.

10. A method as claimed in claim 1, wherein a laminated body is formed on the deposition electrode by depositing solid contents of several successive layers of differently doped suspensions.

11. A method as claimed in claim 10, wherein doped suspensions are used which produce different refractive indices of the glass body to be produced.

12. A method as claimed in claim 1, wherein a thermoplastic and/or an electrically conductive layer are/is provided on the deposition electrode, on which layer the solids content of the suspension is deposited.

13. A method as claimed in claim 1, wherein a deposition electrode is used which is made of a non-metallic, electrically conductive material.

14. A method as claimed in claim 13, wherein a graphite deposition electrode is used.

15. A method as claimed in claim 12, wherein a deposition electrode is used which is made of an electrically insulating material, and on which deposition electrode an electrically conductive layer is provided.

16. A method as claimed in claim 12, wherein the layer comprises 40% by weight of paraffin, having a melting point of from 46° to 50° C. and 60% by weight of graphite powder.

17. A method as claimed in claim 1, wherein a membrane in the form of a porous green body made of the starting material for the glass body to be produced is used as a deposition electrode, the electrophoretic deposition of the solids content of the suspension being produced by means of a movable electrode which is arranged in front of and spaced from the principal surface of the membrane, which faces the deposition surface.

18. A method as claimed in claim 1, wherein the solids content of the suspension is deposited on the deposition electrode at a current density of from 0.01 to 100 $mA/cm^2$ of electrode area.

* * * * *